(12) United States Patent
Anderson

(10) Patent No.: US 6,267,175 B1
(45) Date of Patent: Jul. 31, 2001

(54) COMPOSITE HEAT EXCHANGER HAVING STRENGTHENED JOINTS

(75) Inventor: Alexander F. Anderson, Rolling Hills Estates, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/500,250

(22) Filed: Feb. 8, 2000

(51) Int. Cl.[7] .......................................................... F28F 3/00
(52) U.S. Cl. ................................... 165/166; 165/DIG. 356
(58) Field of Search ...................................... 165/164, 165, 165/166, 167, 146, 170, DIG. 367, DIG. 365, DIG. 387, DIG. 388, DIG. 356

(56) References Cited

U.S. PATENT DOCUMENTS

| 2,601,973 | * | 7/1952 | Jensen ..................................... 165/165 |
| 4,377,400 | * | 3/1983 | Okamoto et al. ..................... 165/166 |
| 4,408,661 | * | 10/1983 | Eastman et al. ...................... 165/164 |
| 4,771,826 | * | 9/1988 | Grehier et al. ........................ 165/166 |
| 5,465,781 | * | 11/1995 | DeGregoria ............................. 165/8 |
| 5,617,913 | * | 4/1997 | DeGregoria et al. ........... 165/104.11 |
| 5,626,188 | * | 5/1997 | Dewar et al. ......................... 165/905 |
| 5,628,363 | * | 5/1997 | Dewar et al. ......................... 165/164 |
| 5,655,600 | * | 8/1997 | Dewar et al. ......................... 165/905 |

* cited by examiner

Primary Examiner—Ira S. Lazarus
Assistant Examiner—Terrell McKinnon
(74) Attorney, Agent, or Firm—William J. Zak, Jr. Esq.

(57) ABSTRACT

A heat exchanger core includes a stack of fins, plates and closure bars. A first plurality of stiff fibers extend into contacting surfaces of the fins and plates, a second plurality of stiff fibers extend into contacting surfaces of the closure bars and plates, and a third plurality of stiff fibers extend into contacting surfaces of the closure bars and manifolds. The stiff fibers can strengthen the heat exchanger assembly and they can also increase thermal conductivity in their direction of orientation.

21 Claims, 5 Drawing Sheets

US 6,267,175 B1

COMPOSITE HEAT EXCHANGER HAVING STRENGTHENED JOINTS

BACKGROUND OF THE INVENTION

The present invention relates to heat exchangers. More specifically, the invention relates to a method of bonding together members of a composite heat exchanger.

An aircraft environmental control system typically includes an air cycle machine and a heat exchanger upstream the air cycle machine. The heat exchanger is used to transfer heat from bleed air to a coolant (e.g., ambient air).

Heat exchangers for aircraft environmental control systems should be lightweight and strong. During operation, the heat exchanger is subjected to large thermal stress and high pressure. The heat exchanger should have sufficient strength to withstand the stress and pressure. Moreover, the walls of the heat exchanger should be made as thin as possible in order to reduce weight. Reducing the weight of the heat exchanger reduces fuel consumption of the aircraft. Reducing fuel consumption, in turn, reduces aircraft operating costs.

The assignee of the present invention has been making aircraft heat exchangers out of carbon/carbon composites. Carbon/carbon composites offer high strength and light weight.

A method of manufacturing a carbon/carbon composite plate-fin heat exchanger core is disclosed in Anderson et al. U.S. Ser. No. 08/601,754 filed Apr. 12, 1996, entitled "CARBON/CARBON HEAT EXCHANGER MANUFACTURING METHOD" and assigned to the assignee of the present invention. A first plurality of woven sheets of low modulus Pitch carbon fibers are impregnated with resin and shaped into fins. A second plurality of sheets of carbon fibers are impregnated with resin and shaped into plates. The resin-impregnated fins are stacked between the resin-impregnated plates to form a stacked assembly, the stacked assembly is then cured, pyrolized, densified and annealed to form a fully graphitized plate-fin heat exchanger core.

Joints between plate and fin tends to be the weakest part of the composite heat exchanger core. It is most likely to separate, especially if subjected to large thermal stress and high pressure. The plate-fin joints also tend to have the lowest thermal conductivity and, therefore, do not maximize the transfer of heat from the bleed air to the coolant.

It would be desirable to increase joint strength. It would also be desirable to increase joint thermal conductivity.

SUMMARY OF THE INVENTION

According to one aspect of the present invention, a heat exchanger comprises a first composite member having a first contacting surface; and a second composite member having a second contacting surface. The second contacting surface is in contact with the first contacting surface. The heat exchanger further comprises a plurality of stiff fibers extending into both contacting surfaces and being embedded in both members.

The fibers can strengthen joints between plates and extended heat transfer surfaces, closure bars and plates, and manifolds and closure bars. The fibers can also increase thermal conductivity in their direction of orientation.

DETAILED DESCRIPTION OF THE INVENTION

Figure 1:
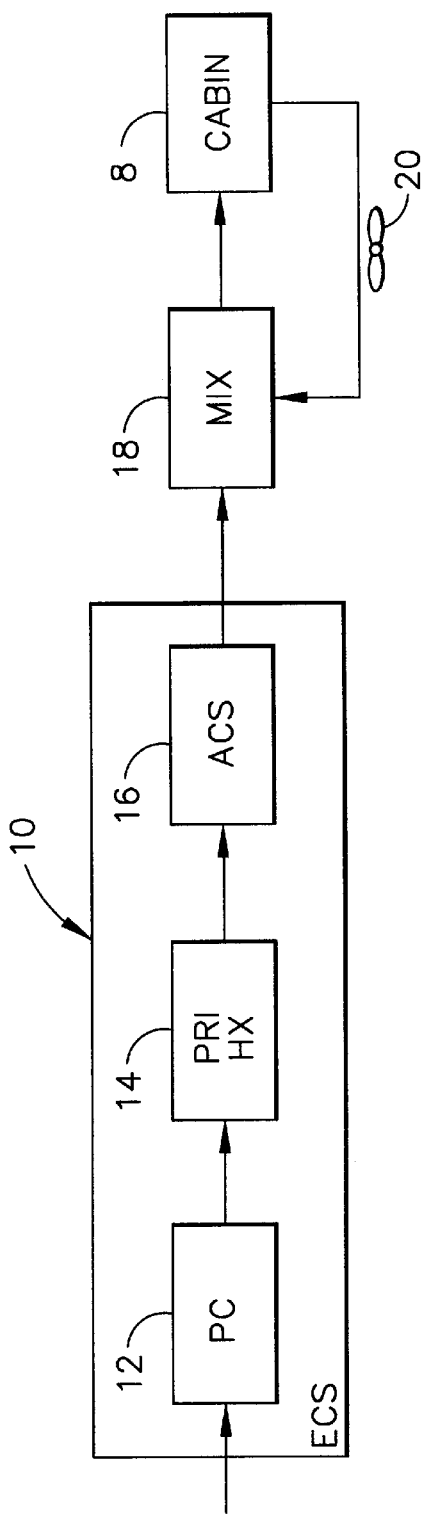
FIG. 1 is an illustration of an environmental control system including two heat exchangers according to the present invention.

FIG. 1 shows an aircraft environmental control system 10 for supplying cooled, conditioned air to an aircraft cabin 8. The environmental control system 10 includes a pre-cooler 12, a primary heat exchanger 14 and an air conditioning system 16. Hot, compressed air (e.g., bleed air) from a source such as an auxiliary power unit or a compressor stage of an aircraft engine is supplied to the pre-cooler 12, which removes the heat of compression. Temperature of the bleed air entering the pre-cooler 12 may be between 900° F. and 1200° F., and temperature of the bleed air leaving the pre-cooler 12 may be between 350° F. and 500° F. The bleed air may be supplied at a pressure of about 100 psig.

The air leaving the pre-cooler 12 is further cooled in the primary heat exchanger 14. Air pressure inside the primary heat exchanger 14 may also be about 100 psig.

Air leaving the primary heat exchanger 14 is cooled and dehumidified in the air conditioning system 16. The air conditioning system 16 may include an air cycle machine for expanding the air and a water extractor for dehumidifying the air. Cooled, conditioned air leaving the air conditioning system 16 may then be supplied to a mix manifold 18. Inside the mix manifold 18, the cooled conditioned air is mixed with recirculated cabin air. The recirculated cabin air may be drawn from the cabin 8 to the mix manifold 18 by a recirculation fan 20. Mixed air leaving the mix manifold 18 is supplied to the aircraft cabin 8. In the alternative, the cooled, conditioned air leaving the air conditioning system 16 may be supplied directly to the cabin 8.

Each heat exchanger 12 and 14 includes a core and manifolds. The core includes a plurality of parting sheets (e.g., plates) and a plurality of extended heat transfer surfaces (e.g., fins) located between the parting sheets and bonded to the parting sheets. The parting sheets and extended heat transfer surfaces define hot side and cold side passageways. During operation of the heat exchangers 12 and 14, a hot fluid flows through the hot side passageways and a coolant flows through the cold side passageways of the heat exchanger 12. Heat is transferred from the hot fluid to the coolant. The manifolds direct fluids to and from the hot side and cold side passageways.

The core and manifolds of the heat exchangers 12 and 14 may be made of a composite material. The primary heat exchanger 14 may be made of a carbon fiber-based composite material such as carbon/carbon composite or epoxy graphite. In the alternative, the primary heat exchanger 14 may be made of a composite material including fibers embedded in a cured thermoplastic. The preferred material for the precooler 12 is a carbon/carbon composite (coated with a material that protects against oxidation), which can withstand the higher operating temperatures and pressures.

The heat exchangers 12 and 14 are not limited to any particular design or configuration. The heat exchangers 12 and 14 may have a cross-flow configuration, a counter-flow configuration, etc. The primary heat exchanger 14, for example, may have the plate-rib design disclosed in Dewar U.S. Pat. No. 5,628,363, which is assigned to the assignee of the present invention, it may have the plate-fin design shown in FIG. 2, etc.

Figure 2:
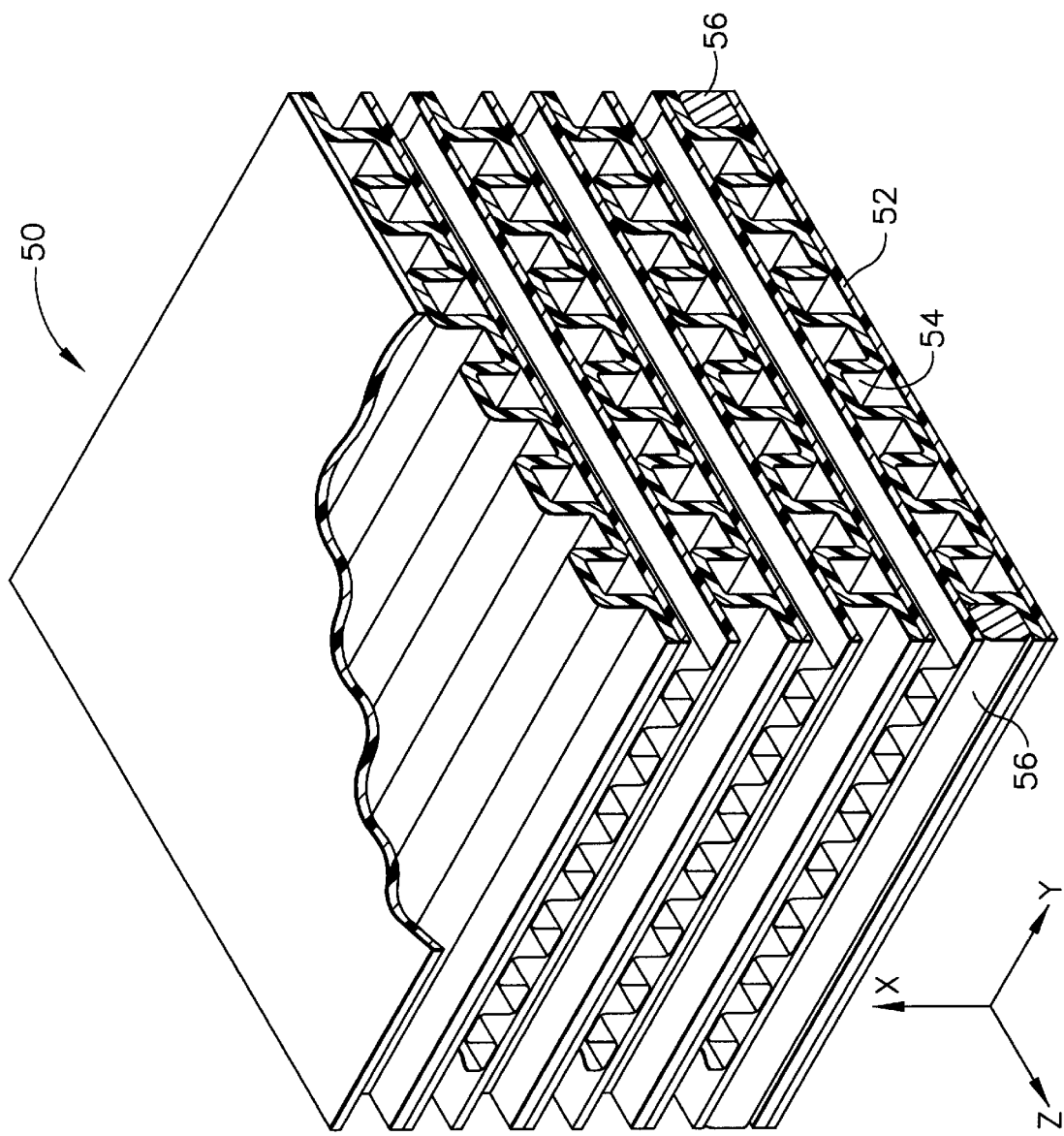
FIG. 2 is an illustration of an exemplary heat exchanger core.

FIG. 2 shows a core 50 of an exemplary cross-flow heat exchanger. The core 50 is fabricated from a plurality of spaced apart plates 52 and a plurality of continuous plain fins 54. The fins 54 are interposed between the plates 52. Contacting surfaces of the fins 54 are bonded to contacting surfaces of the plates 52.

The core 50 also includes a plurality of closure bars 56 interposed between plates 52. A pair of closure bars 56 is shown between ends of the two bottom-most plates 52. Contacting surfaces of the closure bars 56 are bonded to contacting surfaces of the plates 52. Although only two closure bars 56 are shown, the core 50 includes additional pairs of closure bars between ends of the plates 52.

Figure 3:
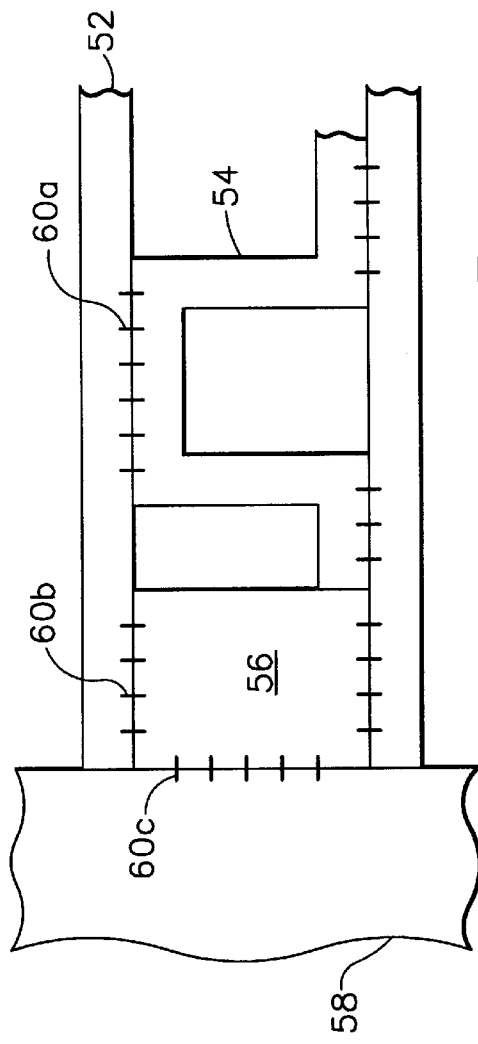
FIG. 3 is an illustration of a plate-fin joint of the heat exchanger core.

Reference is now made to FIG. 3. The bonds between contacting surfaces of the plates 52 and extended heat transfer surfaces 54 are strengthened by a first plurality of stiff fibers 60a. Similarly, the bonds between contacting surfaces of the plates 52 and closure bars 56 are strengthened by a second plurality of stiff fibers 60b, and the bonds between contacting surfaces of the closure bars 56 and manifolds 58 are strengthened by a third plurality of stiff fibers 60c. Thus, the bond between two members 52, 54 or 52, 56 or 56, 58 is strengthened by a plurality of stiff fibers 60a or 60b or 60c.

Each stiff fiber 60a, 60b and 60c extends into the contacting surfaces of both contacting members and is embedded in both contacting members. The stiff fibers may be oriented roughly orthogonal to the contacting surfaces into which they extend. At least one-quarter the length of each stiff fiber is inserted into a contacting member. Each stiff fiber 60a, 60b and 60c may have a length between 1/16" and 1/32"; a diameter between seven and ten microns; and a fiber-like geometry. The stiff fibers 60a, 60b and 60c have a high modulus of elasticity, between 30 Msi and 120 Msi. Additionally, the stiff fibers 60a, 60b and 60c are distributed with a density of between about 50% and 80% of the contacting surface.

The stiff fibers 60a, 60b and 60c may be Pitch carbon fibers or graphite fibers. In addition to strengthening the joints, such fibers 60a, 60b and 60c can increase thermal conductivity in the direction of orientation, thereby increasing heat transfer efficiency. Although not preferred, the fibers could be made of a PAN precursor.

Figure 4:
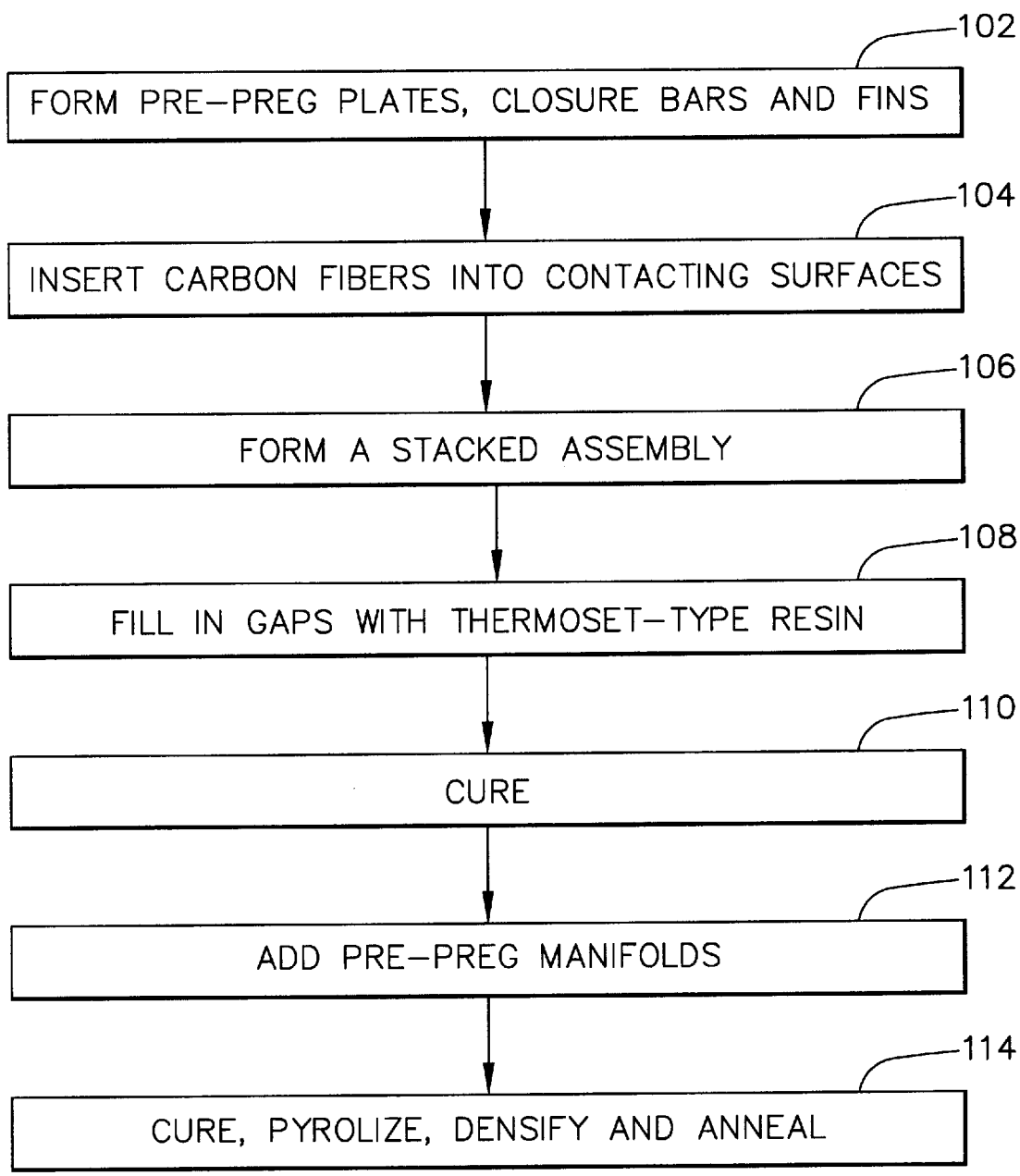
FIG. 4 is a flowchart of a method of fabricating a carbon/carbon composite heat exchanger according to the present invention.

FIG. 4 shows a method of fabricating a carbon/carbon composite heat exchanger assembly having a plate-fin design. A first plurality of woven fabric sheets of carbon fibers are impregnated with a thermoset-type resin and shaped into fins, a second plurality of woven sheets of carbon fibers are impregnated with the thermoset-type resin and shaped into plates (block 102), and a third plurality of woven sheets of carbon fibers are impregnated with the thermoset-type resin and shaped into closure bars. Resulting are "pre-preg" members.

Stiff carbon fibers are interposed between contacting surfaces of the prep-preg members (block 104) and the members are stacked to form a stacked assembly (block 106). Some stiff carbon fibers will become embedded into plates and fins of the stacked assembly, and other stiff fibers will become embedded in plates and closure bars. Still other stiff fibers will extend from contacting surfaces of the closure bars and will, eventually, be embedded in manifolds. The stiff carbon fibers are oriented in a particular direction, such as orthogonal to the contacting surfaces.

Any gaps between plates and fins are filled with additional thermoset-type resin (block 108). The resulting stacked assembly may then be cured, whereby the plates, extended heat transfer surfaces, closure bars and stiff carbon fibers are bonded together (block 110).

Pre-preg manifolds may then pressed onto the cured assembly (block 112). Additional resin is added to fill any gaps between the manifolds and the core assembly, and the resulting assembly is cured (to bond the manifolds to the core), pyrolized, densified and annealed (block 114). Resulting is a fully graphitized plate-fin heat exchanger assembly.

Figure 5:
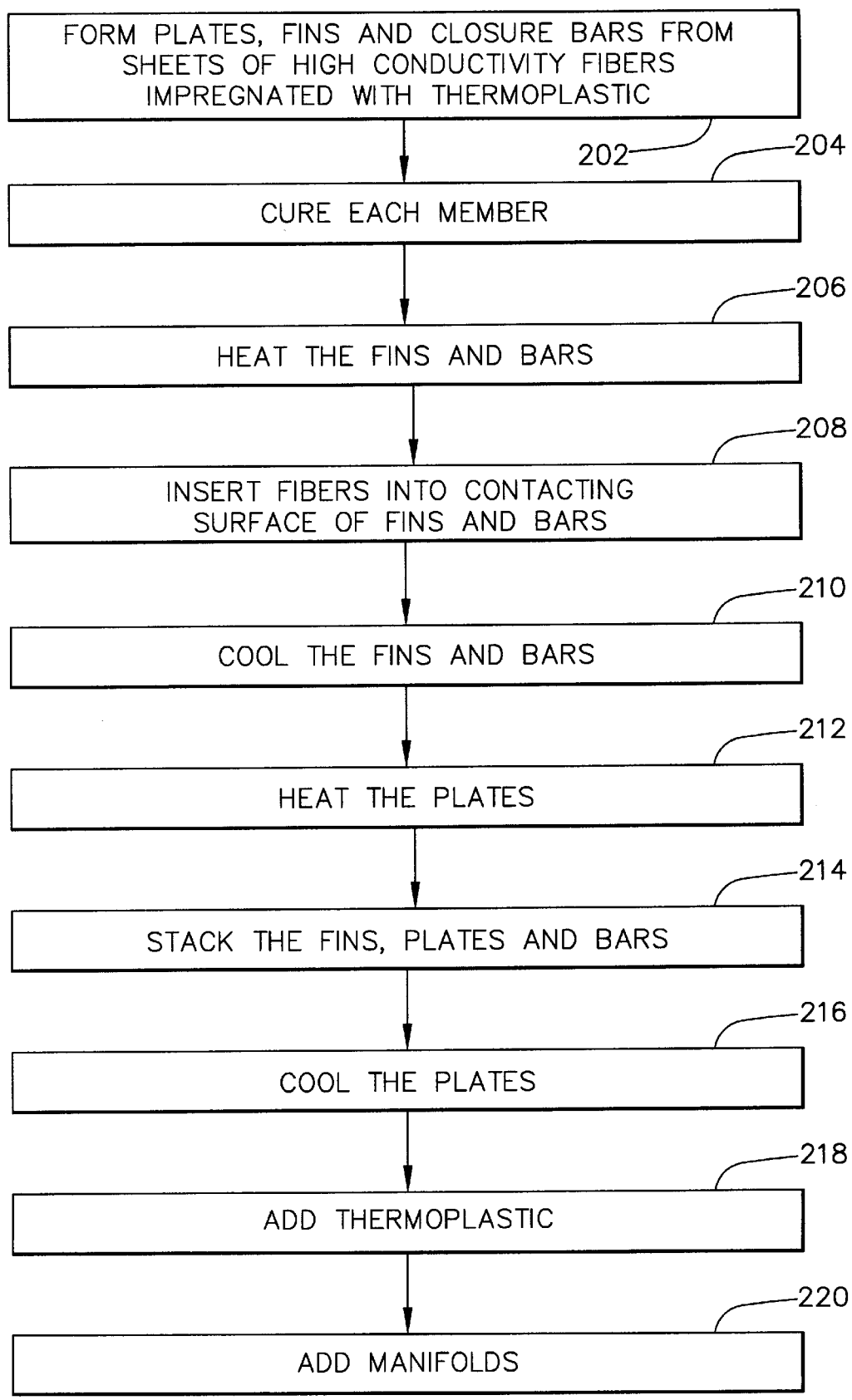
FIG. 5 is a flowchart of a method of fabricating a different composite heat exchanger according to the present invention.

FIG. 5 shows a method of fabricating a different plate-fin heat exchanger assembly. Sheets of high conductivity fibers (e.g., graphite) are formed into plates, fins and closure bars and embedded in a thermoplastic-type resin such as "PEEK" resin or "NYLON" resin (block 202). Each member is also cured (block 204).

The closure bars and fins are heated to soften the thermoplastic-type resin (block 206), and individual stiff fibers are inserted into contacting surfaces and into the bars and fins (block 208). The bars and fins are cooled to harden the thermoplastic-type resin (block 210).

The plates are heated to soften the thermoplastic-type resin (block 212), and the plates, fins and closure bars are stacked and loaded to form a core assembly (block 214). As the plates are stacked onto the fins and closure bars, the stiff fibers are inserted into the softened thermoplastic of the plates. The plates are then cooled to harden the plate thermoplastic (block 216). Gaps between the members may be filled with additional thermoplastic-type resin and cured (218). Resulting is a core assembly.

Manifolds may also be added (block 220). The manifolds, which may also be made of fibers embedded in a cured thermoplastic-type resin, are heated (to soften the thermoplastic-type resin) and pressed onto the core assembly. As the manifolds are pressed onto the core assembly, fibers extending from the closure bars become embedded in the manifolds. After the manifolds have been pressed onto the core assembly, the manifolds are cooled. Resulting is a heat exchanger assembly.

Figure 6:
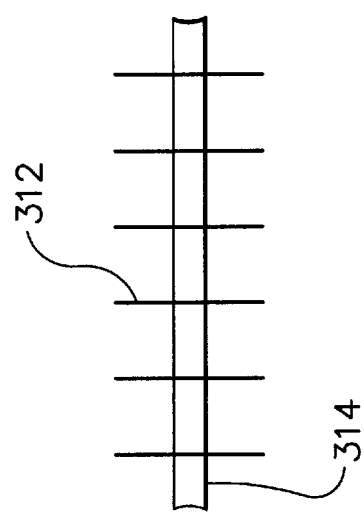
FIG. 6 is an illustration of a first method of orienting stiff fibers during fabrication of a heat exchanger.

FIG. 6 shows one way in which the stiff fibers 312 may be oriented relative to the contacting surfaces of the members. The stiff fibers 312 extend through a thin mesh 314 in a preferred orientation. The fiber-penetrated mesh is interposed between contacting surfaces of the members. If, for example, the members are made of Pitch carbon fibers 312 that are impregnated with a thermoset-type resin, the fiber-penetrated mesh 314 is interposed between contacting surfaces of the members, the members are pressed together, additional resin is added, and the members are cured. If, for example, the members are made fibers 312 that are impregnated with a thermoplastic-type resin that has been cured, the members are softened, the fiber-penetrated mesh 314 is interposed between contacting surfaces of the members, the members are pressed together, and the members are cooled.

The mesh 314 may be made of a carbon or graphite veil having a thickness between one-half and two mils. Prior to inserting the stiff fibers 312 into the mesh 314, those mesh areas not corresponding to contacting surfaces may be masked. The stiff fibers 312 may then be inserted through the unmasked portions of the mesh 314. The stiff fibers 312 may be secured to the mesh 314 by a spray adhesive.

Figure 7:
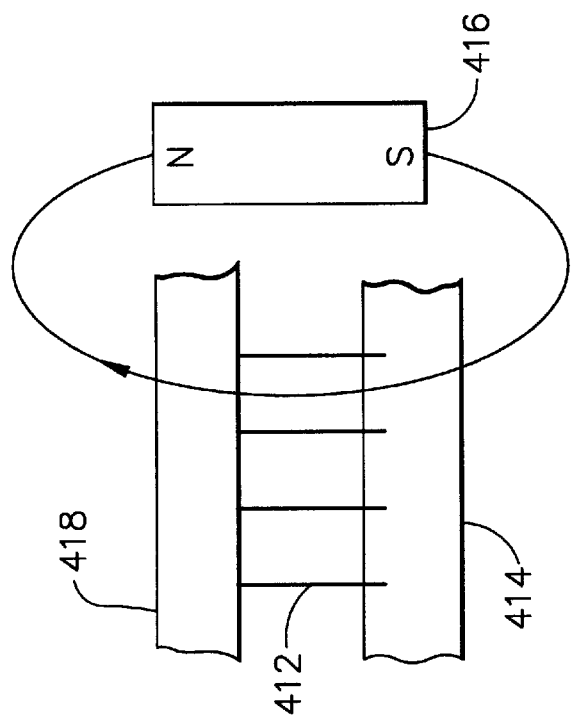
FIG. 7 is an illustration of a second method of orienting stiff fibers during fabrication of a heat exchanger.

FIG. 7 shows another way in which the stiff fibers 412 may be oriented relative to the contacting surfaces of a member 414. The stiff fibers 412 are sprinkled onto a contacting surface of the member 414, and a magnetic field (from a magnet 416) is applied so that the stiff fibers 412 line up vertically in the desired orientation. Resulting is a dense pile of stiff fibers 412. Ends of the polarized fibers 412 may then be pressed into the member by such means as a plate 418.

The depictions of the stiff fibers shown in FIGS. 3, 6 and 7 are not intended to portray accurate size, geometry, density, etc. They are merely provided to help explain the invention.

The invention is not limited to the specific embodiments described above. The method of FIG. 4 may be applied to an epoxy graphite heat exchanger, except that graphite fibers would be used as the starting material (instead of Pitch carbon fibers), a different thermoset-type resin would be used, and the steps of pyrolizing, densifying and annealing would not be performed.

Extended heat transfer surfaces other than continuous plain fins may be used. For example, the extended heat transfer surfaces may be ribs as disclosed in assignee's U.S. Pat. No. 5,628,363.

The heat exchanger core is not limited to a plate-fin configuration. Nor is the heat exchanger core limited to Pitch carbon or graphite fibers.

The invention is not limited to an environmental control system. It may be used in any high temperature, high pressure environment.

Therefore, the invention is not limited to the specific embodiments described above. Instead, the invention is construed according to the claims that follow.

What is claimed is:

1. A heat exchanger comprising:
    a stack of composite plates and composite members in contact with the plates, the composite members being at least one of an extended heat transfer surface and an enclosure bar; and
    a plurality of stiff fibers, each fiber embedded in both a contacting plate and member of the stack.

2. The heat exchanger of claim 1, wherein the composite members include extended heat transfer surfaces.

3. The heat exchanger of claim 1, wherein the composite members include enclosure bars.

4. The heat exchanger of claim 1, wherein the fibers are roughly orthogonal to contacting surfaces of the plates and members.

5. The heat exchanger of claim 1, wherein the plates and members are made of carbon/carbon composite.

6. The heat exchanger of claim 1, wherein the plates and members are made of fabric embedded in a cured thermoplastic-type resin.

7. The heat exchanger of claim 1, wherein between at least one-quarter the length of each fiber is embedded in a plate and at least one-quarter the length of each fiber is embedded in a member.

8. The heat exchanger of claim 1, wherein the fibers have a length between 1/16" and 1/32"; a diameter between 7 and 10 microns; and a stiffness between 30 Msi and 120 Msi.

9. The heat exchanger of claim 1, wherein the fibers have a density of about 50% to 85% of contacting surface area between the plates and members.

10. An environmental control system comprising:
    an air conditioning system; and
    a heat exchanger upstream from the air conditioning system, the heat exchanger including a stacked assembly of plates and fins, and a plurality of stiff fibers, each fiber extending into contacting surfaces of a fin and a plate, each fiber being embedded in both a fin and a plate.

11. The system of claim 10, wherein the stacked assembly further includes a plurality of closure bars and a second plurality of stiff fibers, each fiber of the second plurality extending into contacting surfaces of a closure bar and a plate, each fiber of the second plurality being embedded in both a closure bar and a plate.

12. The system of claim 10, wherein the stacked assembly further includes a plurality of manifolds and a second plurality of stiff fibers, each fiber of the second plurality extending into contacting surfaces of a manifold and a plate, each fiber of the second plurality being embedded in both a manifold and a plate.

13. A method of fabricating a composite heat exchanger core including a plurality of plates and members, the members being selected from the group consisting of extended heat transfer surfaces and enclosure bars, each plate and member including fabric that is impregnated with resin, the method comprising:
    forming a stacked core assembly of the plates and the members; and
    partially inserting a plurality of stiff fibers into the plates and members while forming the stacked core assembly, each fiber extending into one of the plates and one of the members.

14. The method of claim 13, wherein the fibers are oriented prior to insertion in the plates and members.

15. The method of claim 14, wherein the fibers are oriented by polarizing the fibers, whereby the fibers are aligned in a direction of polarization.

16. The method of claim 14, wherein the fibers are oriented by inserting the fibers through a thin mesh and placing the mesh between contacting surfaces of the plates and members.

17. The method of claim 13, wherein the resin is a thermoplastic that has been cured; wherein the plates are heated to soften the resin, the fibers are inserted in the plates, the members are heated to soften the resin, the plates and members are pressed together, and the plates and members are cooled to harden the resin.

18. The method of claim 13, wherein the resin is a thermoset, wherein the fibers are inserted into the plates and members before the plates and members have been cured, and wherein the plates and members are cured after having been pressed together.

19. The method of claim 13, further comprising attaching a manifold to the stacked core assembly; and inserting a plurality of stiff fibers into the manifold and enclosure bars while attaching the manifold.

20. A heat exchanger comprising
    a stack of composite plates and composite enclosure bars:
    a composite manifold having a surface in contact with a surface of at least one of the enclosure bars; and
    a plurality of stiff fibers, each fiber embedded in both the manifold and an enclosure bar in contact with the manifold.

21. A method of fabricating a heat exchanger including a plurality of composite plates, a plurality of composite enclosure bars and a manifold, each plate, member and manifold including fabric that is impregnated with resin, the method comprising:
    forming a stacked core assembly of the plates and the enclosure bars;

securing the manifold to at least one of the enclosure bars; and partially inserting a plurality of stiff fibers into the manifold and each enclosure bar making contact with the manifold, each fiber extending into the manifold and one of the contacting enclosure bars.

* * * * *